United States Patent
Gerard et al.

(10) Patent No.: US 10,040,889 B2
(45) Date of Patent: Aug. 7, 2018

(54) LIQUID (METH) ACRYLIC SYRUP IT'S METHOD OF POLYMERIZATION, USE AND MOLDED ARTICLE OBTAINED THEREOF

(71) Applicant: Arkema France, Colombes (FR)

(72) Inventors: Pierre Gerard, Denguin (FR); Daniel Callin, Caubios-Loos (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/786,193

(22) PCT Filed: Apr. 25, 2014

(86) PCT No.: PCT/EP2014/058500
§ 371 (c)(1),
(2) Date: Oct. 22, 2015

(87) PCT Pub. No.: WO2014/174098
PCT Pub. Date: Oct. 30, 2014

(65) Prior Publication Data
US 2016/0090434 A1    Mar. 31, 2016

(30) Foreign Application Priority Data
Apr. 25, 2013 (FR) .................................. 13 53796

(51) Int. Cl.
C08F 265/06 (2006.01)
C08F 220/14 (2006.01)
C08J 5/24 (2006.01)
C08J 5/04 (2006.01)
B29C 70/42 (2006.01)

(52) U.S. Cl.
CPC .......... *C08F 265/06* (2013.01); *C08F 220/14* (2013.01); *C08J 5/04* (2013.01); *C08J 5/24* (2013.01); *B29C 70/42* (2013.01); *C08J 2333/06* (2013.01); *C08J 2351/00* (2013.01)

(58) Field of Classification Search
CPC ......... C08F 265/06; C08F 220/14; C08J 5/24; C08J 2351/00; B29C 70/42
See application file for complete search history.

(56) References Cited

U.S. PATENT DOCUMENTS

| | | |
|---|---|---|
| 3,287,155 A | 11/1966 | Munn |
| 3,900,444 A | 8/1975 | Racky et al. |
| 4,036,811 A | 7/1977 | Noetzel et al. |
| 2004/0225086 A1 | 11/2004 | Lapairy |
| 2007/0299171 A1 | 12/2007 | Couillens et al. |
| 2010/0112882 A1 | 5/2010 | Conesa et al. |
| 2012/0064323 A1* | 3/2012 | Shoemake ............... C08J 5/043 428/220 |
| 2014/0256850 A1 | 9/2014 | Gerard et al. |
| 2015/0218362 A1 | 8/2015 | Gerard et al. |

FOREIGN PATENT DOCUMENTS

| | | |
|---|---|---|
| KR | 1009949223 B | 11/2010 |
| WO | WO 2007/007663 A1 | 1/2007 |
| WO | WO 2014/135810 A2 | 9/2014 |
| WO | WO 2014/135815 A1 | 9/2014 |
| WO | WO 2014/135816 A1 | 9/2014 |
| WO | WO 2014/140467 A1 | 9/2014 |

OTHER PUBLICATIONS

Hammami, A., et al.; Polymer Composites, 2000, p. 28-40.*

* cited by examiner

*Primary Examiner* — Robert Jones, Jr.
(74) *Attorney, Agent, or Firm* — Thomas F. Roland

(57) ABSTRACT

The present invention relates to a liquid (meth)acrylic syrup, its method of polymerization and article obtained thereof. In particular the present invention deals with a liquid (meth) acrylic syrup comprising an initiation system for polymerization at low temperature. More particularly the present invention relates to a liquid (meth)acrylic syrup comprising an initiator system for polymerization at low temperature, said initiating system comprises at least one accelerator, at least one organic aldehyde, at least one peracid and at least one liquid peroxy compound; an impregnation process for a fibrous substrate, the liquid (meth)acrylic syrup for implementing this process, and the obtained impregnated fibrous substrate. The impregnated fibrous substrate is suitable for manufacturing mechanical or structured parts or articles. The present invention concerns also the process for polymerizing a liquid (meth)acrylic syrup comprising an initiation system for polymerization at low temperature said initiating system comprises at least one accelerator, at least one organic aldehyde, at least one peracid, and at least one liquid peroxy compound. The present invention concerns also manufacturing process for manufacturing mechanical or structured parts or articles and three-dimensional mechanical or structured parts obtained by this process.

22 Claims, No Drawings

LIQUID (METH) ACRYLIC SYRUP IT'S METHOD OF POLYMERIZATION, USE AND MOLDED ARTICLE OBTAINED THEREOF

This application claims benefit, under U.S.C. § 119 or § 365 of PCT Application No. PCT/EP2014/058500 filed Apr. 25, 2014; and French Application Number FR 13.53796, filed Apr. 25, 2013.

FIELD OF THE INVENTION

The present invention relates to a liquid (meth) acrylic syrup its method of polymerization and article obtained thereof.

In particular the present invention deals with a liquid (meth) acrylic syrup comprising an initiation system for polymerization at low temperature.

More particular present invention relates to a liquid (meth) acrylic syrup comprising an initiation system for polymerization at low temperature said initiating system comprises at least one accelerator, at least one organic aldehyde, at least one peracid and at least one liquid peroxy compound; an impregnation process for a fibrous substrate, the liquid (meth) acrylic syrup for implementing this process and the obtained impregnated fibrous substrate. The impregnated fibrous substrate is suitable for manufacturing mechanical or structured parts or articles.

The present invention concerns also the process for polymerizing a liquid (meth) acrylic syrup comprising an initiation system for polymerization at low temperature said initiating system comprises at least one accelerator, at least one organic aldehyde at least one peracid and at least one liquid peroxy compound.

The present invention concerns also manufacturing process for manufacturing mechanical or structured parts or articles and three-dimensional mechanical or structured parts obtained by this process.

Technical Problem

Molded articles can be obtained by polymerizing a liquid resin comprising a monomer and a compound for starting or initiating the polymerization and injecting this liquid resin in a mold. There are initiators or initiating systems that are activated by heat, meaning that the mold is heated for starting the polymerization. There are also applications where "cold-cure" is necessary or wished, an accelerator is usually added additionally to the liquid resin. Cold cure means that the polymerization takes place or can start at ambient temperature, meaning less than 40° C. The mold has not necessarily to be heated, but could be additionally heated in order to speed up the kinetics.

Once all the necessary compounds for the polymerization are together in form of a liquid resin: the monomer, the initiator and the accelerator; the system is active and the polymerization will start inevitably after a certain time. This means the liquid resin has to be used nearly immediately; it has a very limited shelf life.

Therefore the necessary compounds for the polymerization: the monomer, the initiator and the accelerator are mixed together in form of a liquid resin only moments just before the injection. This is done by using 2 component injection with a mixing head just before injection machine. The first component might comprise the monomer and the accelerator while the second component is the monomer mixed with the initiator. The premature start of the polymerization is avoided.

However the initiator is often a solid product. It is in form of a powder that is used, for example benzoyl peroxide. The benzoyl peroxide is tried to be mixed with the monomer. The peroxide powder is not completely solubilized meaning no homogenous solution is obtained. The non solubilized powder might sink down, a non homogenous mixture is obtained and the quantities of the peroxide injected are not correct or at least there is a variation with time. Another problem of solid initiators that are not correctly solubilized, is their accumulation in the tubing or the blocking of the tubing by accumulated solids for the injection of the liquid syrup. The initiator could be solved in a solvent miscible with the liquid monomer, but the presence of a solvent is not desirable in the mold, once the polymerization has been taken place.

The objective of the present invention is to solve the disadvantages mentioned above.

One objective of the present invention is to propose a liquid (meth)acrylic resin composition for injection molding or impregnation of a fibrous substrate that polymerizes at low temperature in a reasonable time.

Another objective of the present invention is to have liquid (meth)acrylic resin composition for injection molding or impregnation of a fibrous substrate that can easily prepared in a one or two component system and mixed homogenously before the injection or impregnation.

The further objective of the present invention is to have a liquid (meth)acrylic resin composition for injection molding or impregnation of a fibrous substrate that does not block the tubing before the injection or leaves solids coming from not dissolved solids.

Still another objective of the present invention is to wet completely, correctly and in a homogenous way the fibrous substrate during impregnation. Any defects of fiber wetting for example by bubbles and voids decrease the mechanical performance of the structural part.

Still another objective of the present invention is to have a structural part comprising a thermoplastic composite material with satisfying mechanical properties such as high stiffness and a young modulus of at least 15 GPa.

BACKGROUND OF THE INVENTION

Prior Art

The document FR1256929 describes an impregnation process process with a liquid (meth) acrylic syrup and of polymerization of acrylic monomers especially methacrylic monomers from monomer-polymer syrups using benzoyl peroxide as initiator.

The document U.S. Pat. No. 3,476,723 describes a process for the peroxide curing of a monomer-polymer syrup solution containing a polymer of methyl methacrylate or a copolymer of methyl methacrylate. The curing system comprises an organic peroxide, a vanadium based accelerator and an aliphatic aldehyde.

The document U.S. Pat. No. 3,287,155 describes a process for impregnating glass fiber mat with methyl methacrylate polymer. The process includes the use a monomer-polymer syrup comprising tin chloride and copper as accelerators and peroxides as curing agents.

The document WO2003/008463 describes a method for polymerising vinyl monomers and/or oligomers comprising at least one vinyl radical. Therefore the vinyl monomer is mixed with at least one dioxygen supplying agent, at least one aldehyde and at least one accelerator.

BRIEF DESCRIPTION OF THE INVENTION

Surprisingly it has been found that a liquid (meth) acrylic syrup comprising:

a) a (meth)acrylic polymer,
b) a (meth)acrylic monomer,
c) at least one initiating system for starting the polymerization of the (meth) acrylic monomer, characterized that said initiating system comprises at least one accelerator, at least one organic aldehyde and a peroxy compound and organic peracid characterized that the peroxy compound is a liquid at least at a temperature range between 0° C. and 50° C., can be injected correctly homogenously without agglomeration in the injection head or blocking of the tubing, and can be used for the impregnation of the fibrous substrate and polymerization at low temperature.

Surprisingly it has also been discovered that an impregnation liquid (meth) acrylic syrup for implementing the impregnation process for a fibrous substrate, said liquid (meth) acrylic syrup comprises:
a) a (meth)acrylic polymer,
b) a (meth)acrylic monomer,
c) at least one initiating system for starting the polymerization of the (meth) acrylic monomer,
said initiating system comprises at least one accelerator, at least one organic aldehyde and a peroxy compound and organic peracid characterized that the peroxy compound is a liquid at least at a temperature range between 0° C. and 50° C.;
yields to a complete and correct impregnation of the fibrous substrate.

Surprisingly it has also been discovered that a manufacturing process for manufacturing mechanical or structured parts or articles comprising following steps:
a) impregnating a fibrous substrate with a liquid (meth) acrylic syrup comprising a (meth)acrylic polymer, a (meth)acrylic monomer and at least one initiating system for starting the polymerization of the (meth) acrylic monomer, characterized that said initiating system comprises at least one accelerator, at least one organic aldehyde and a peroxy compound and organic peracid characterized that the peroxy compound is a liquid at least at a temperature range between 0° C. and 50° C.
b) polymerising the liquid (meth) acrylic syrup impregnating said fibrous substrate yields to manufactured mechanical or structured parts or articles having satisfying mechanical properties by possessing a high stiffness and a young modulus of at least 15 GPa.

Additionally it has also been discovered that a three-dimensional mechanical or structured parts obtained by the manufacturing process possessing a high stiffness and a young modulus of at least 15 GPa, has nearly no defects as voids between the fibrous substrate and the (meth)acrylic polymer.

DETAILED DESCRIPTION OF THE INVENTION

According to a first aspect, the present invention relates to a liquid (meth) acrylic syrup comprising:
a) a (meth)acrylic polymer,
b) a (meth)acrylic monomer,
c) at least one initiating system for starting the polymerization of the (meth) acrylic monomer,
characterized that said initiating system comprises at least one accelerator, at least one organic aldehyde and a peroxy compound and organic peracid characterized that the peroxy compound is a liquid at least at a temperature range between 0° C. and 50° C.

By the term "(meth) acrylic" as used is denoted all kind of acrylic and methacrylic monomers.

By the term "PMMA" as used are denoted homo- and copolymers of methylmethacrylate (MMA), for the copolymer of MMA the weight ratio of MMA inside the PMMA is at least 70 wt %.

By the term "monomer" as used is denoted is a molecule which can under go polymerization.

By the term "polymerization" as used is denoted the process of converting a monomer or a mixture of monomers into a polymer.

By the term "thermoplastic polymer" as used is denoted a polymer that turns to a liquid or becomes more liquid or less viscous when heated and that can take on new shapes by the application of heat and pressure.

By the term "initiator" as used is denoted a chemical species that's reacts with a monomer to form an intermediate compound capable of linking successively with a large number of other monomers into a polymeric compound.

By the term "initiating system" as used is denoted a system comprising several components capable of staring a polymerization.

By the term "peroxy compound" as used is denoted a compound comprising at least one group R—O—O—R.

By the term "polymer composite" or "thermoplastic composite" as used is denoted a multicomponent material comprising multiple different phase domains in which at least one type of phase domain is a continuous phase and in which at least one component is a polymer or respectively a thermoplastic polymer.

By the term "fibrous substrate" as used are denoted fabrics, felts or nonwovens that may be in the form of strips, laps, braids, locks or pieces.

With regard to the (metha)acrylic polymer, one could mention poly alkyl methacrylates or poly alkyl acrylates. In a preferred embodiment the (meth)acrylic polymer is poly methyl methacrylate (PMMA).

The term "PMMA" denotes a methyl methacrylate (MMA) homopolymer or a copolymer or mixtures thereof.

In one embodiment the homo- or copolymer of methyl methacrylate (MMA) comprises at least 70%, preferably at least 80%, advantageously at least 90% and more advantageously at least 95% by weight of methyl methacrylate.

In another embodiment the PMMA is a mixture of at least one homopolymer and at least one copolymer of MMA, or a mixture of at least two homopolymers or two copolymers of MMA with a different average molecular weight or a mixture of at least two copolymers of MMA with a different monomer composition.

The copolymer of methyl methacrylate (MMA) comprises from 70% to 99.7% by weight of methyl methacrylate and from 0.3 to 30% by weight of at least one monomer having at least one ethylenic unsaturation that can copolymerize with methyl methacrylate.

These monomers are well known and mention may be made, in particular of acrylic and methacrylic acids and alkyl-(meth)acrylates in which the alkyl group has from 1 to 12 carbon atoms. As examples, mention may be made of methyl acrylate and ethyl, butyl or 2-ethylhexyl (meth) acrylate. Preferably the comonomer is an alkyl acrylate in which the alkyl group has from 1 to 4 carbon atoms.

In a preferred embodiment the copolymer of methyl methacrylate (MMA) comprises from 80% to 99.7% advantageously from 90% to 99.7% and more advantageously from 90% to 99.5% by weight of methyl methacrylate and from 0.3% to 20% advantageously from 0.3% to 10% and more advantageously from 0.5% to 10% by weight of at least one monomer having at least one ethylenic unsaturation that can copolymerize with methyl methacrylate. Preferably the comonomer is chosen from methyl acrylate or ethyl acrylate or mixtures thereof.

The weight average molecular weight of the (meth)acrylic polymer should be high, meaning larger than 50000 g/mol, preferably larger than 100000 g/mol.

The weight average molecular weight can be measured by size exclusion chromatography (SEC).

With regard to the (meth)acrylic monomer, the monomer is chosen from acrylic acid, methacrylic acid, alkyl acrylic monomers, alkyl methacrylic monomers and mixtures thereof.

Preferably the monomer is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the meth)acrylic monomer is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

More advantageously the monomer is chosen (meth) acrylic monomer is chosen from methyl methacrylate, isobornyl acrylate or acrylic acid and mixtures thereof.

In a preferred embodiment at least 50 wt %, preferably at least 60 wt % of the monomer is methyl methacrylate.

In a more preferred embodiment at least 50 wt %, preferably at least 60 wt %, more preferably at least 70 wt % and advantageously at least 80 wt % and even more advantageously 90 wt % of the monomer is a mixture of methyl methacrylate with isobornyl acrylate and/or acrylic acid.

With regard to the initiating system for starting the polymerization of the (meth) acrylic monomer, one could mention initiators or initiating systems that are activated at low temperature by an accelerator. The initiator is preferably a radical initiator for example a peroxy compound.

The presence of activators or accelerators is necessary for "cold-cure". Cold cure means that the polymerization could start at ambient temperature, meaning less than 40° C.

The initiating system according to the invention comprises at least one accelerator, at least one organic aldehyde, at least one a peroxy compound and at least one organic peracid. The organic peroxy and the organic peracid are not considered as the same compound.

The initiating system according to the invention can be mixed with the other two compounds (the (meth)acrylic polymer and (meth)acrylic monomer) in one or several steps.

In a preferred embodiment the (meth)acrylic polymer and at least a part (meth)acrylic monomer are mixed before adding all or a at least a part of the compounds of the initiating system.

With regard to the peroxy compound according to the invention, it is peroxide, preferably organic peroxide. The peroxide is liquid at least in a temperature range between 0° C. and 50° C.

Preferably the peroxide in the initiating system for starting the polymerization of the (meth) acrylic monomer is chosen from peroxides comprising from 2 to 30 carbon atoms.

The initiator for initiating system for starting the polymerization of the (meth) acrylic monomer is chosen from methyl ethyl ketone peroxide, methyl isobutyl ketone peroxide, acetyl acetone peroxide, cyclohexanone peroxide, 1,1-di(tert-butylperoxy) cyclohexanone, tert-butyl peroxybenzoate, tert-butyl peroxy-2-ethylhexanoate or mixtures thereof.

The (meth)acrylic monomer is typically one or more monomers as defined above with, optionally, a suitable inhibitor such as hydroquinone (HQ), methyl hydroquinone (MEHQ), 2,6-di-tertiary-butyl-4-methoxyphenol (Topanol O) and 2,4-dimethyl-6-tertiary-butyl phenol (Topanol A).

The inhibitor is present to prevent the monomer from spontaneously polymerising.

With regard to the accelerator according to the invention, it comprises a transition metal. The accelerator is an organic-soluble compound comprising a transition metal.

Preferably the transition metal is chosen from the $4^{th}$ period of the periodic system of elements.

Advantageously the transition metal is chosen from Manganese, Cobalt, Iron or Copper and more advantageously Manganese, Iron, Copper or mixtures thereof.

With regard to the aldehyde according to the invention, it has the general formula R1CHO (1):

(1)

The group R1 in formula (1) is an organic rest comprising between 1 and 30 carbon atoms. Preferably R1 is and hydrocarbon comprising between 1 and 30 carbon atoms. Advantageously R1 is an aliphatic or aromatic hydrocarbon comprising between 1 and 30 carbon atoms. More advantageously R1 is chosen from C1 to C24 alkyl and/or C6 to C10 aryl.

The alkyl group can be linear, branched, cyclic or comprise also carbon-carbon double bonds.

With regard to the peracid according to the invention, it has the general formula R1COOOH (2):

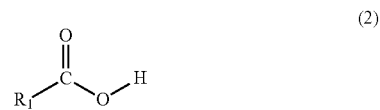

(2)

The group R1 in formula (2) is an organic rest comprising between 1 and 30 carbon atoms. Preferably R1 is and hydrocarbon comprising between 1 and 30 carbon atoms. Advantageously R1 is an aliphatic or aromatic hydrocarbon comprising between 1 and 30 carbon atoms. More advantageously R1 is chosen from C1 to C24 alkyl or C6 to C10 aryl.

The alkyl group can be linear, branched, cyclic or comprise also carbon-carbon double bonds.

Another ingredient in the liquid resin can also be a chain-limiting agent in order to control the molecular weight, for example γ-terpinene or terpinolene, at contents of between 0 and 500 ppm and preferably between 0 and 100 ppm, with respect to the monomers of the mixture.

The impregnation process according to the invention for impregnating a fibrous substrate comprises a step of impregnating the fibrous substrate with a liquid (meth)acrylic syrup.

A simple (meth)acrylic monomer or a (meth)acrylic monomer mixture as liquid (meth)acrylic syrup is too liquid for the impregnation process of the present invention, especially for the correct and complete wetting and impregnation of the fibrous substrate. Therefore the viscosity has to be adapted by increasing it.

With regard to the liquid (meth) acrylic syrup according to the invention that impregnates the fibrous substrate, it comprises a (meth)acrylic monomer or a mixture of a (meth)acrylic monomers, a (meth)acrylic polymer and at least the initiating system for starting the polymerization of the (meth) acrylic monomer.

Advantageously the liquid (meth) acrylic syrup contains no metal based catalysts. As metals are considered the metal elements from the p-block of the periodic table of elements only (including the groups 13 to 16 and therefore consequently excluding the alkaline metals, earth alkaline metals and transition metals). No metal comprising additives as activators for catalytically accelerate the polymerization reaction are added to liquid (meth) acrylic syrup or are brought into contact with the liquid (meth) acrylic syrup according to the invention. These concerns especially tin based compounds as tin chloride.

According to the invention the viscosity is increased by using (meth)acrylic monomer or a mixture of a (meth) acrylic monomers with dissolved (meth)acrylic polymer or (meth)acrylic polymers. This solution is commonly referred to as "syrup" or "prepolymer".

Advantageously the liquid (meth) acrylic syrup contains no additionally voluntary added solvent.

The (meth)acrylic polymer is completely soluble in the (meth)acrylic monomer.

This (meth)acrylic polymer is PMMA, meaning the homo- or copolymer of methyl methacrylate (MMA) or a mixture thereof as defined before.

This (meth)acrylic monomer is the same as defined before.

The (meth)acrylic monomer or the (meth)acrylic monomers in the liquid (meth) acrylic syrup present at least 40% by weight, preferably 50% by weight, advantageously 60% by weight and more advantageously 65% by weight of total liquid (meth) acrylic syrup.

The (meth)acrylic polymer or polymers in the liquid (meth) acrylic syrup present at least 10% by weight, preferable at least 15%, advantageously at least 18% and more advantageously at least 20% by weight of total liquid (meth) acrylic syrup.

The (meth)acrylic polymer or polymers in the liquid (meth) acrylic syrup present at most 60% by weight, preferable at most 50%, advantageously at most 40% and more advantageously at most 35% by weight of total liquid (meth) acrylic syrup.

The dynamic viscosity of the liquid (meth) acrylic syrup is in a range from 10 mPa*s to 10000 mPa*s, preferably from 50 mPa*s to 5000 mPa*s and advantageously from 100 mPa*s to 1000 mPa*s. The viscosity of the syrup can be easily measured with a Rheometer or viscosimeter. The dynamic viscosity is measured at 25° C. The liquid (meth) acrylic syrup has a Newtonian behaviour, meaning no shear thinning, so that the dynamic viscosity is independent of the shearing in a rheometer or the speed of the mobile in a viscosimeter.

If the viscosity of the liquid (meth) acrylic syrup at a given temperature is too high for the impregnation process, it is possible to heat the syrup in order to have a more liquid syrup for the sufficient wetting and correct and complete impregnation of the fibrous substrate.

With regard to the fibrous substrate, one can mention fabrics, felts or nonwovens that may be in the form of strips, laps, braids, locks or pieces. The fibrous material can have different forms and dimensions either one dimensional, two dimensional or three dimensional. A fibrous substrate comprises an assembly of one or more fibres. When the fibres are continuous, their assembly forms fabrics.

The one dimensional form is linear long fibres. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers.

The fibers have an aspect ratio of at least 1000, preferably at least 1500, more preferably at least 2000, advantageously at least 3000, more advantageously at least 5000, even more advantageously at least 6000, most advantageously at least 7500 and at most advantageously at least 10000.

The two dimensional form are fibrous mats or non woven reinforcements or woven roving or bundles of fibers, which can also be braided. Even if these two dimensional forms have a certain thickness and therefore in principle a third dimension, they are considered as two dimensional according to the present invention.

The three dimensional form are for example stacked or folded fibrous mats or non woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylalcohol, polyolefins, polyurethanes, polyvinylchloride, polyethylene, unsaturated polyesters, epoxy resins and vinylesters.

The mineral fibers can also be chosen from glass fibers especially of type E, R or S2, carbon fibers, boron fibers or silica fibers.

The fibrous substrate of the present invention is chosen from vegetable fibers, wood fibers, animal fibers, mineral fibers, synthetic polymeric fibers, glass fibers, carbon fibers or mixtures thereof.

Preferably the fibrous substrate is chosen from mineral fibers.

The fibres of the fibrous material have a diameter between 0.005 μm and 100 μm, preferably between 1 μm and 50 μm, more preferably between 5 μm and 30 μm and advantageously between 10 μm and 25 μm.

Preferably the fibres of the fibrous material of the present invention are chosen from continuous fibres (meaning that the aspect ratio does not apply as for long fibres) for the one dimensional form, or long or continuous fibres forming the two or three dimensional form of the fibrous substrate.

The quantity of the initiating system is from 2.1 parts by weight to 26 parts by weight in view of the sum of the (meth)acrylic monomer and a (meth)acrylic polymer, the last two together make up 100 parts by weight. The quantities are given in view of the liquid (meth) acrylic syrup injected or used for impregnation.

The initiating system according to the invention comprises:
From 0.1 to 5 part by weight of peroxy compound,
≤1 parts by weight of accelerator calculated on the part of the transition metal in the accelerator,
from 1 to 10 parts by weight of at least one organic aldehyde, and
from 1 to 10 parts by weight of at least one organic peracid.
Preferably the initiating system comprises:
from 0.5 to 3 part by weight of peroxy compound,
from 0.001-0.5 parts by weight of accelerator calculated on the part of the transition metal in the accelerator,
from 2 to 8 parts by weight of at least one organic aldehyde, and
from 2 to 8 parts by weight of at least one organic peracid.

As mentioned before the respective quantities can be prepared in a two component system in order to avoid the polymerisation while handling all components during the preparation and waiting time before injection or impregnation.

Once the application all components can be mixed together a recipient in order to obtain the liquid (meth) acrylic syrup according to the invention. Or the components are mixed in a mixing head or device just a few moments before injection or impregnation in order to obtain the liquid (meth) acrylic syrup according to the invention. By a few moments is meant a time less then 30 minutes preferably less then 10 minutes.

An additional aspect according to the present invention is the impregnation process, for impregnating a fibrous substrate, wherein said fibrous substrate is made of long fibres and said process comprises a step of impregnating said fibrous substrate with a liquid (meth) acrylic syrup comprising:
  a) from 10 to 60 part by weight of (meth)acrylic polymer,
  b) from 40 to 90 parts by weight of (meth)acrylic monomer,
  c) from 2.1 to 26 parts by weight of one initiating system for starting the polymerization of the (meth) acrylic monomer,
said initiating system comprises at least one accelerator, at least one organic aldehyde and a peroxy compound and organic peracid, characterized that the peroxy compound is a liquid at least at a temperature range between 0° C. and 50° C.

Another additional aspect according to the present invention is the impregnation liquid (meth) acrylic syrup for implementing the impregnation process, said liquid (meth) acrylic syrup comprises:
  a) a (meth)acrylic polymer,
  b) a (meth)acrylic monomer,
  c) at least one initiating system for starting the polymerization of the (meth) acrylic monomer,
said liquid (meth)acrylic syrup has a dynamic viscosity of a value in the range from 10 mPa*s to 10000 mPa*s, preferably from 50 mPa*s to 5000 mPa*s and advantageously from 100 mPa*s to 1000 mPa*s and said initiating system comprises at least one accelerator, at least one organic aldehyde and a peroxy compound and organic peracid, characterized that the peroxy compound is a liquid at least at a temperature range between 0° C. and 50° C.

Still another additional aspect according to the present invention is an impregnation liquid (meth) acrylic syrup comprising:
  a) from 10 to 60 part by weight of (meth)acrylic polymer,
  b) from 40 to 90 parts by weight of (meth)acrylic monomer,
  c) from 2.1 to 26 parts by weight of one initiating system for starting the polymerization of the (meth) acrylic monomer,
said initiating system comprises at least one accelerator, at least one organic aldehyde and a peroxy compound and organic peracid, characterized that the peroxy compound is a liquid at least at a temperature range between 0° C. and 50° C.

Still another aspect of the present invention is a manufacturing process for manufacturing mechanical or structured parts or articles comprising following steps:
  a) impregnating a fibrous substrate with a liquid (meth) acrylic syrup,
  b) polymerising the liquid (meth) acrylic syrup impregnating said fibrous substrate.

Preferably the impregnation of the fibrous substrate in step a) is made in a closed mold.

Advantageously the step a) and step b) are made in the same closed mould.

With regard to manufacturing process for manufacturing mechanical or structured parts or articles comprising the polymeric composite material, several methods could be used in order to prepare three-dimensional mechanical or structured parts. One can mention infusion, vacuum bag moulding, pressure bag molding, autoclave molding, resin transfer moulding (RTM), reaction injection molding (RIM) reinforced reaction injection molding (R-RIM) and variants thereof, press molding or compression molding.

The preferred manufacturing process for manufacturing mechanical or structured parts or articles comprising the composite materials are processes were the liquid (meth) acrylic syrup transferred to the fibrous substrate by impregnating the fibrous substrate in a mold more preferably in a closed mold.

Advantageously the impregnation step of the fibrous material is made in a closed mold.

Most advantageously the manufacturing process for manufacturing mechanical or structured parts or articles comprising the polymeric composite material is chosen from resin transfer molding or infusion.

All processes comprise the step of impregnating the fibrous substrate with the liquid (meth) acrylic syrup according to the invention before the polymerization step in a mold.

The step of polymerising of the liquid (meth) acrylic syrup impregnating said fibrous substrate takes place after the impregnation step in the same mold.

Resin transfer molding is a method using a two sided mold set which forms both surfaces of composite material. The lower side is a rigid mould. The upper side can be a rigid or flexible mould. Flexible moulds can be made from composite materials, silicone or extruded polymer films such as nylon. The two sides fit together to produce a mould cavity. The distinguishing feature of resin transfer moulding is that the fibrous substrate is placed into this cavity and the mould set is closed prior to the introduction of the liquid (meth) acrylic syrup. Resin transfer moulding includes numerous varieties which differ in the mechanics of how the liquid (meth) acrylic syrup is introduced to the fibrous substrate in the mould cavity. These variations include everything from vacuum infusion to vacuum assisted resin transfer moulding (VARTM). This process can be performed at either ambient or elevated temperature.

With the infusion method the liquid (meth) acrylic syrup does have to have the adapted viscosity towards this preparation method of the polymeric composite material. The liquid (meth) acrylic syrup is aspired into the fibrous substrate present in a special mold by application of a slight vacuum. The fibrous substrate is infused and completely impregnated by the liquid (meth) acrylic syrup.

One advantage of this method is the high amount of fibrous material in the composite.

With regard to the use of manufactured mechanical or structured parts or articles, one can mention automotive applications, nautical applications, railroad applications, sport, aeronautic and aerospace applications, photovoltaic applications, computer related applications, telecommunication applications and wind energy applications.

Particularly the three-dimensional mechanical or structured part is a automobile part, boat part, train part, sport article, plane or helicopter part, space ship or rocket part, photovoltaic module part, wind turbine part, furniture part, construction or building part, telephone or cell phone part, computer or television part, printer and photocopy part.

EXAMPLES

Example 1 (Comparative)

A syrup is prepared by dissolving 25 parts by weight of the PMMA (BS520 a copolymer of MMA comprising ethyl acrylate as a comonomer) in 75 parts by weight of methyl methacrylate, which is stabilized with MEHQ (hydroquinone monomethyl ether). To the 100 parts by weight of the syrup are added 0.8 parts by weight of benzoyl peroxide (BPO—Luperox A75 from ARKEMA) and 0.3 parts by weight of DMPT (N,N-dimethyl-p-toluidine from Sigma-Aldrich). The syrup has a dynamic viscosity of 520 mPa*s at 25° C. The powder of benzoyl peroxide is not completely dissolved on the syrup. Once the agitation is stopped solid particles are still visible and they settle at the bottom of the recipient.

The syrup is polymerized in a recipient of 100 ml of volume at a surrounding temperature or 25±1° C. The temperature is measured with aid of a temperature detector put inside the syrup. After 40 minutes the temperature arrives at a peak.

Example 2 (Comparative)

The same basic syrup based on MMA and PMMA as in example 1 is prepared. To the 100 parts by weight of the syrup are added 1 part by weight of methyl ethyl ketone peroxide a liquid product (MEKP—Luperox K12 from ARKEMA) and 0.018 parts by weight based on the cobalt of cobalt octoate (from Sigma Aldrich). The syrup is transparent.

The syrup is polymerized in a recipient of 100 ml of volume at a surrounding temperature or 25±1° C. The temperature is measured with aid of a temperature detector put inside the syrup. The temperature arrives at a peak after more then 24 hours.

Example 3 (Comparative)

The same basic syrup based on MMA and PMMA as in example 1 is prepared. To the 100 parts by weight of the syrup are added 1 part by weight of methyl ethyl ketone peroxide a liquid product (MEKP—Luperox K12 from ARKEMA) and 0.018 parts by weight based on the cobalt of cobalt octoate (from Sigma Aldrich), 2.5 parts by weight of lemarone (from Sigma Aldrich), 2.5 parts by weight of phenyl acetaldehyde (from Sigma Aldrich). The syrup is transparent.

The syrup is polymerized in a recipient of 100 ml of volume at a surrounding temperature or 25±1° C. The temperature is measured with aid of a temperature detector put inside the syrup. After 97 minutes the temperature arrives at a peak.

Example 4 (According to the Invention)

The same basic syrup based on MMA and PMMA as in example 1 is prepared. To the 100 parts by weight of the syrup are added 1 part by weight of methyl ethyl ketone peroxide a liquid product (MEKP—Luperox K12 from ARKEMA), 0.1 parts by weight based on the copper of copper based activator (Nouryact CF12 from AKZO), 2.5 parts by weight of lemarone (from Sigma Aldrich), 2.5 parts by weight of phenyl acetaldehyde (from Sigma Aldrich) and 5 parts by weight of peracetic acid (from Sigma Aldrich). The syrup is transparent.

The syrup is polymerized in a recipient of 100 ml of volume at a surrounding temperature or 25±1° C. The temperature is measured with aid of a temperature detector put inside the syrup. After 75 minutes the temperature arrives at a peak.

The invention claimed is:
1. Liquid (meth) acrylic syrup comprising:
a) a (meth)acrylic polymer,
b) a (meth)acrylic monomer,
c) at least one initiating system for starting the polymerization of the (meth) acrylic monomer,
wherein said initiating system comprises
from 0.1 to 5 part by weight of peroxy compound,
≤1 parts by weight of accelerator calculated on the part of the transition metal in the accelerator,
from 1 to 10 parts by weight of at least one organic aldehyde, and
from 1 to 10 parts by weight of at least one organic peracid in view of the sum of the (meth)acrylic monomer and a (meth)acrylic polymer, the two together make up 100 parts by weight,
wherein the peroxy compound is a liquid at a temperature between 0° C. and 50° C.

2. The liquid (meth) acrylic syrup according to claim 1 comprising:
a) from 10 to 60 part by weight of (meth)acrylic polymer,
b) from 40 to 90 parts by weight of (meth)acrylic monomer,
c) from 2.1 to 26 parts by weight of one initiating system for starting the polymerization of the (meth) acrylic monomer.

3. The liquid (meth) acrylic syrup according to claim 1, wherein the accelerator comprises a transition metal compound.

4. The liquid (meth) acrylic syrup according to claim 3 wherein the transition metal is chosen from the $4^{th}$ period.

5. The liquid (meth) acrylic syrup according to claim 3 wherein the transition metal is chosen from manganese, cobalt, iron or copper and or mixtures thereof.

6. The liquid (meth) acrylic syrup according to claim 1 wherein the peroxy compound is an organic peroxide comprising from 2 to 30 carbon atoms.

7. The liquid (meth) acrylic syrup according to claim 1 wherein the organic aldehyde has the general formula R1CHO, wherein R1 is an organic group comprising between 1 and 30 carbon atoms.

8. The liquid (meth) acrylic syrup according to claim 1 wherein the organic peracid has the general formula R1COOOH, wherein R1 is an organic group comprising between 1 and 30 carbon atoms.

9. The liquid (meth) acrylic syrup according to claim 1, wherein said liquid (meth)acrylic syrup has a dynamic viscosity of a value in the range from 10 mPa*s to 10000 mPa*s, measured at 25° C.

10. A process for polymerizing a liquid (meth) acrylic syrup comprising the step of
   mixing the components of said liquid (meth)acrylic syrup at a time of less than 30 minutes before injection in a mold or impregnation of a fibrous substrate, wherein said components of said (meth)acrylic syrup comprise:
   a) a (meth)acrylic polymer,
   b) a (meth)acrylic monomer,
   c) at least one initiating system for starting the polymerization of the (meth) acrylic monomer,
   said initiating system comprises from 0.1 to 5 part by weight of peroxy compound,
   ≤1 parts by weight of accelerator calculated on the part of the transition metal in the accelerator,
   from 1 to 10 parts by weight of at least one organic aldehyde, and
   from 1 to 10 parts by weight of at least one organic peracid
   in view of the sum of the (meth)acrylic monomer and a (meth)acrylic polymer, the two together make up 100 parts by weight,
   wherein the peroxy compound is a liquid at a temperature between 0° C. and 50° C.

11. The process according to claim 10, wherein said liquid (meth) acrylic syrup comprises:
   a) from 10 to 60 part by weight of (meth)acrylic polymer,
   b) from 40 to 90 parts by weight of (meth)acrylic monomer,
   c) from 2.1 to 26 parts by weight of one initiating system for starting the polymerization of the (meth) acrylic monomer.

12. An impregnation process for impregnating a fibrous substrate, wherein said fibrous substrate is made of long fibres said long fibers having an aspect ratio of at least 1000, and said process comprises a step of impregnating said fibrous substrate with a liquid (meth) acrylic syrup comprising:
   a) a (meth)acrylic polymer,
   b) a (meth)acrylic monomer,
   c) at least one initiating system for starting the polymerization of the (meth) acrylic monomer,
   wherein said initiating system comprises from 0.1 to 5 part by weight of peroxy compound,
   ≤1 parts by weight of accelerator calculated on the part of the transition metal in the accelerator,
   from 1 to 10 parts by weight of at least one organic aldehyde, and
   from 1 to 10 parts by weight of at least one organic peracid
   in view of the sum of the (meth)acrylic monomer and a (meth)acrylic polymer, the two together make up 100 parts by weight,
   wherein the peroxy compound is a liquid at a temperature between 0° C. and 50° C.

13. The impregnation process according to claim 12, wherein said liquid (meth)acrylic syrup has a dynamic viscosity of a value in the range from 10 mPa*s to 10000 mPa*s, measured at 25° C.

14. The impregnation process according to claim 12, wherein the (meth)acrylic polymer is a homo- or copolymer of methyl methacrylate (MMA) or a mixture thereof.

15. The impregnation process according to claim 12, wherein the copolymer of methyl methacrylate (MMA) comprises from 70% to 99.7% by weight of at least one monomer having at least one ethylenic unsaturation that can copolymerize with methyl methacrylate.

16. A manufacturing process for manufacturing mechanical or structured parts or articles comprising following steps:
   a) impregnating a fibrous substrate with a liquid (meth) acrylic syrup according to claim 1,
   b) polymerising the liquid (meth) acrylic syrup impregnating said fibrous substrate.

17. The process according to claim 16, wherein the impregnation of the fibrous substrate in step a) is made in a closed mold.

18. The process according to claim 16 wherein step a) and step b) occur in the same closed mold.

19. The process according to claim 16 wherein the process is resin transfer molding or infusion.

20. The process according to claim 16, wherein the temperature of the polymerization is step b) is below 40° C.

21. Three-dimensional mechanical or structured parts obtained by the manufacturing process according to claim 16.

22. Part according to claim 21, which is a automobile part, boat part, train part, sport article, plane or helicopter part, space ship or rocket part, photovoltaic module part, wind turbine part, furniture part, construction or building part, telephone or cell phone part, computer or television part, printer and photocopy part.

* * * * *